(12) United States Patent
Shimizu et al.

(10) Patent No.: US 11,043,859 B2
(45) Date of Patent: Jun. 22, 2021

(54) PERMANENT MAGNET ROTATING ELECTRIC MACHINE

(71) Applicant: MEIDENSHA CORPORATION, Tokyo (JP)

(72) Inventors: Takahiro Shimizu, Tokyo (JP); Yosuke Arai, Tokyo (JP); Kenji Kawakubo, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 211 days.

(21) Appl. No.: 16/464,417

(22) PCT Filed: Nov. 27, 2017

(86) PCT No.: PCT/JP2017/042389
§ 371 (c)(1),
(2) Date: May 28, 2019

(87) PCT Pub. No.: WO2018/116750
PCT Pub. Date: Jun. 28, 2018

(65) Prior Publication Data
US 2021/0119505 A1     Apr. 22, 2021

(30) Foreign Application Priority Data

Dec. 22, 2016  (JP) .............................. JP2016-248572
Dec. 22, 2016  (JP) .............................. JP2016-248573

(51) Int. Cl.
*H02K 1/27*   (2006.01)
*H02K 1/28*   (2006.01)

(52) U.S. Cl.
CPC ............. *H02K 1/2733* (2013.01); *H02K 1/28* (2013.01)

(58) Field of Classification Search
CPC ......... H02K 1/2733; H02K 1/178; H02K 1/28
See application file for complete search history.

(56) References Cited

U.S. PATENT DOCUMENTS

2013/0062984 A1*  3/2013  Tremelling ............... H02K 1/12
                                                        310/156.28
2019/0036404 A1*  1/2019  Takano .................... H02K 1/28

FOREIGN PATENT DOCUMENTS

| EP | 1 811 631 A2 | 7/2007 |
|----|--------------|--------|
| JP | 2001-169487 A | 6/2001 |
| JP | 2001-231201 A | 8/2001 |
| JP | 2007-195354 A | 8/2007 |
| JP | 2014-64427 A | 4/2014 |
| JP | 2014-64428 A | 4/2014 |

* cited by examiner

*Primary Examiner* — Thomas Truong
(74) *Attorney, Agent, or Firm* — Foley & Lardner LLP

(57) ABSTRACT

A permanent magnet rotating electric machine is provided with: a magnet portion comprising a plurality of permanent magnets forming a plurality of sets each of which is attached annularly and which are disposed along an axial direction of a rotor; and a plurality of anti-scattering rings press-fitted along the axial direction around the outer circumference of the magnet portion forming the plurality of sets. The anti-scattering rings each have: an insulation coating provided on both side surfaces contacting adjacent, other anti-scattering rings; a chamfer provided between the outer circumferential surface and one side surface; and an insulation coating provided on the chamfer.

20 Claims, 6 Drawing Sheets

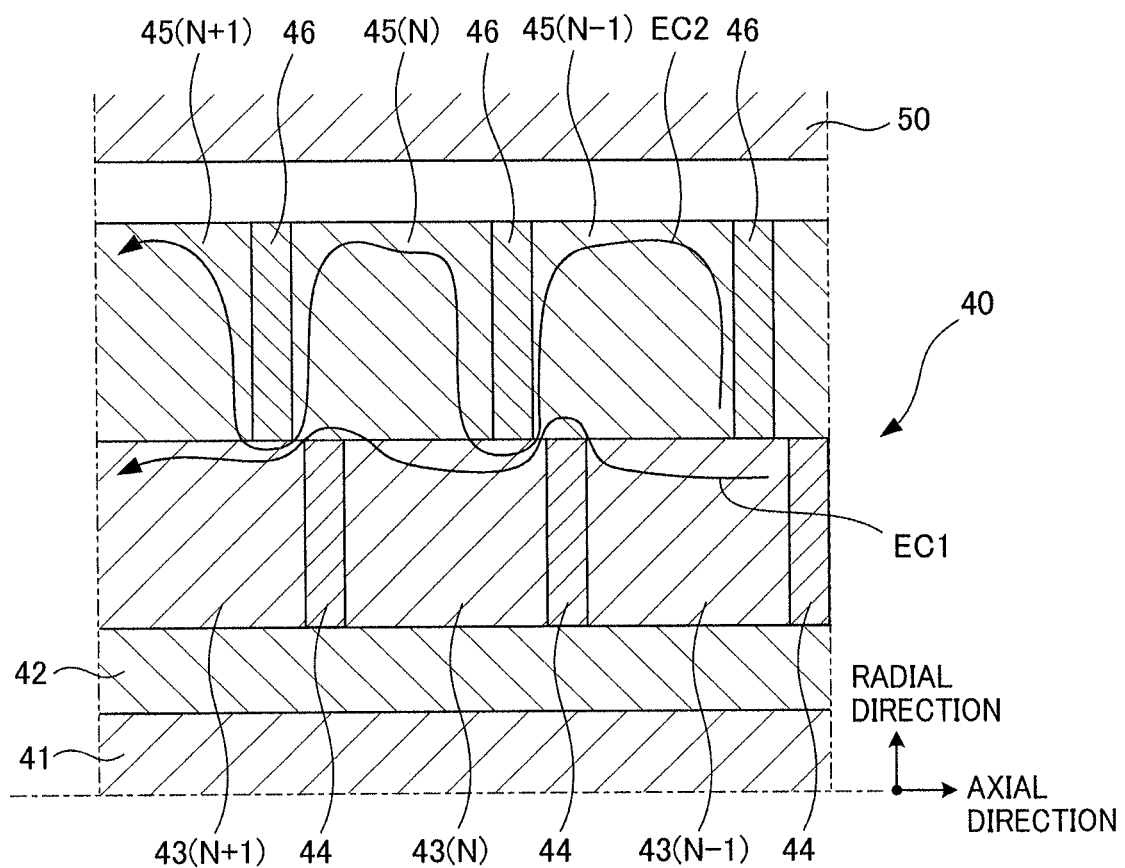

PERMANENT MAGNET ROTATING ELECTRIC MACHINE

TECHNICAL FIELD

The present invention relates to a permanent magnet rotating electric machine and in particular to the structure of a rotor in a surface-attached permanent magnet rotating electric machine.

BACKGROUND ART

Patent Document 1 discloses a permanent magnet rotating electric machine that suppresses rise in temperature of its permanent magnets due to generation of fluctuating torque. To describe Patent Document 1 with reference to its FIG. 1, during high-speed rotation or when fluctuating torque is generated, eddy current loss occurs in permanent magnets 5. Thus, insulating members 8*b* are used to block eddy current paths. This reduces magnetic field variation at the position of each spacer 8 and eddy current loss due to the variation. Accordingly, rise in temperature of the spacer 8 itself is reduced and thus rise in temperature of the permanent magnets 5 is reduced.

Also, Patent Document 2 discloses a surface-attached permanent magnet rotating electric machine, or a so-called SPM motor (Surface Permanent Magnet Motor), which suppresses increase in eddy current loss in retaining rings and permanent magnets. To describe Patent Document 2 with reference to its FIG. 2, in order to suppress increase in eddy current loss, there are provided first clearances (S111) that block eddy current paths in permanent magnets (101) and second clearances (S112) that block eddy current paths in retaining rings (102).

PRIOR ART DOCUMENTS

Patent Documents

Patent Document 1: Japanese Patent Application Publication No. 2001-231201
Patent Document 2: Japanese Patent Application Publication No. 2014-064428

SUMMARY OF THE INVENTION

Problems to be Solved by the Invention

In the structure of the rotor illustrated in FIG. 1 of Patent Document 1, no insulating material (insulating coating) is present on the outer surfaces of either the permanent magnets 5 or the spacers 8. Thus, although insulation between the side surfaces of the spacers 8 is maintained, if fine iron powder, electrically conductive materials, or the like attracted to the permanent magnets 5 are attached around the outer surfaces between the neighboring spacers 8 or if indentations are formed on the outer surfaces of the spacers 8, an eddy current may still be conducted and impair the above-mentioned effect of reducing the eddy current loss. Also, as described in paragraph 0019 and other paragraphs in Patent Document 1, the spacers 8 are fixed simply by being bolted to retaining rings (not illustrated) provided at the opposite axial ends. During high-speed rotation or when fluctuating torque is generated, the permanent magnets 5 may possibly be scattered radially by the centrifugal force. This may prevent operation with high-speed rotation and highly fluctuating torque.

Also, with the structure of the rotor illustrated in FIG. 2 of Patent Document 2, a jig such as a spacer for forming clearances is needed during the manufacturing. Thus, there is a problem of an increased jig cost. Also, in the case where a fluid is present in the motor, the presence of recesses and protrusions on the rotor may increase the pipeline resistance and thereby increase the loss. Also, to describe Patent Document 2 with its FIG. 3, there are clearances D1 in the axial direction, and each magnet's axial length Li is accordingly shorter, thereby reducing the magnet torque. Performance deterioration is inevitable in particular for a surface-attached permanent magnet rotating electric machine, which uses only magnet torque.

Also, as described in paragraph 0035 in Patent Document 2, the retaining rings (102) are shrink-fitted on the outer peripheries of the permanent magnets (101). Thus, the manufacturing process involves heating the retaining rings (102), which requires time and effort, and the temperature control is difficult. For example, in the case of using a titanium alloy or the like for the retaining rings (102), it takes time to raise the temperature and also the temperature needs to be high due to the low coefficient of thermal expansion, thereby making the temperature control difficult. Moreover, change of the material's properties due to the high temperature can be problematic.

The present invention has been made in view of the above problems, and an object thereof is to provide a permanent magnet rotating electric machine capable of handling high-speed rotation and highly fluctuating torque by reducing eddy current loss and improving the centrifugal endurance of its rotor.

Means for Solving the Problem

A permanent magnet rotating electric machine according to a first aspect of the invention for solving the above problem includes a plurality of magnet parts each including a plurality of permanent magnets attached to each other in an annular shape, the plurality of magnet parts being disposed along an axial direction of a rotor; and a plurality of annular members press-fitted on outer peripheries of the plurality of magnet parts along the axial direction, in which each of the annular members has a first side surface insulating portion provided on one or both of side surfaces in abutment with other neighboring ones of the annular members, a chamfered surface provided between an outer peripheral surface and one of the side surfaces, and a chamfered surface insulating portion provided on the chamfered surface.

In the permanent magnet rotating electric machine according to the first aspect of the invention, a permanent magnet rotating electric machine according to a second aspect of the invention for solving the above problem is characterized in that the chamfered surface is a flat surface or a curved surface.

In the permanent magnet rotating electric machine according to the first or second aspect of the invention, a permanent magnet rotating electric machine according to a third aspect of the invention for solving the above problem is characterized in that the chamfered surface is provided on a side toward which the press fitting is performed.

Note that the permanent magnet rotating electric machines according to the above first to third aspects of the invention may further be such that each of the annular members has a first chamfered surface provided between an inner peripheral surface and one or both of the side surfaces, each of the magnet parts has a second side surface insulating portion provided on one or both of side surfaces in contact with other neighboring ones of the magnet parts, and a second chamfered surface provided between an outer peripheral surface and one or both of the side surfaces, and the magnet parts and the annular members are disposed such that a space formed by the first chamfered surface of one or both of the neighboring annular members and a space formed by the second chamfered surface of one or both of the neighboring magnet parts communicate with each other.

Further, each of the first chamfered surface and the second chamfered surface may be a flat surface or a curved surface.

Further, each of the annular members may have an inner peripheral surface insulating portion provided on an inner peripheral surface.

Further, each of the magnet parts may have an outer peripheral surface insulating portion provided on an outer peripheral surface.

Further, at least one of a first chamfered surface insulating portion provided on the first chamfered surface and a second chamfered surface insulating portion provided on the second chamfered surface may be included.

A permanent magnet rotating electric machine according to a fourth aspect of the invention for solving the above problem includes a plurality of magnet parts each including a plurality of permanent magnets attached to each other in an annular shape, the plurality of magnet parts being disposed along an axial direction of a rotor; and a plurality of annular members press-fitted on outer peripheries of the plurality of magnet parts along the axial direction, in which each of the annular members has a first side surface insulating portion provided on one or both of side surfaces in abutment with other neighboring ones of the annular members, and a first chamfered surface provided between an inner peripheral surface and one or both of the side surfaces, each of the magnet parts has a second side surface insulating portion provided on one or both of side surfaces in abutment with other neighboring ones of the magnet parts, and a second chamfered surface provided between an outer peripheral surface and one or both of the side surfaces, and the magnet parts and the annular members are disposed such that a space formed by the first chamfered surface of one or both of the neighboring annular members and a space formed by the second chamfered surface of one or both of the neighboring magnet parts communicate with each other.

In the permanent magnet rotating electric machine according to the fourth aspect of the invention, a permanent magnet rotating electric machine according to a fifth aspect of the invention for solving the above problem is characterized in that each of the first chamfered surface and the second chamfered surface is a flat surface or a curved surface.

In the permanent magnet rotating electric machine according to the fourth or fifth aspect of the invention, a permanent magnet rotating electric machine according to a sixth aspect of the invention for solving the above problem is characterized in that each of the annular members has an inner peripheral surface insulating portion provided on an inner peripheral surface.

In the permanent magnet rotating electric machine according to the fourth to sixth aspects of the invention, a permanent magnet rotating electric machine according to a seventh aspect of the invention for solving the above problem is characterized in that each of the magnet parts has an outer peripheral surface insulating portion provided on an outer peripheral surface.

In the permanent magnet rotating electric machine according to the fourth to seventh aspects of the invention, a permanent magnet rotating electric machine according to an eighth aspect of the invention for solving the above problem further includes at least one of:

a first chamfered surface insulating portion provided on the first chamfered surface; and a second chamfered surface insulating portion provided on the second chamfered surface.

Note that the permanent magnet rotating electric machines according to the above fourth to eighth aspects of the invention may further be such that each of the annular member has a chamfered surface provided between an outer peripheral surface and one of the side surfaces, and a chamfered surface insulating portion provided on the chamfered surface.

Further, the chamfered surface may be a flat surface or a curved surface.

Further, the chamfered surface may be provided on a side toward which the press fitting is performed.

Effect of the Invention

The present invention reduces eddy current loss in a permanent magnet rotating electric machine and also improves the centrifugal of its rotor, thus enabling the permanent magnet rotating electric machine handle high-speed rotation and highly fluctuating torque.

BRIEF DESCRIPTION OF THE DRAWINGS

FIG. 6 is a cross-sectional view explaining a problem with a rotor in a conventional permanent magnet rotating electric machine.

MODES FOR CARRYING OUT THE INVENTION

Figure 1:
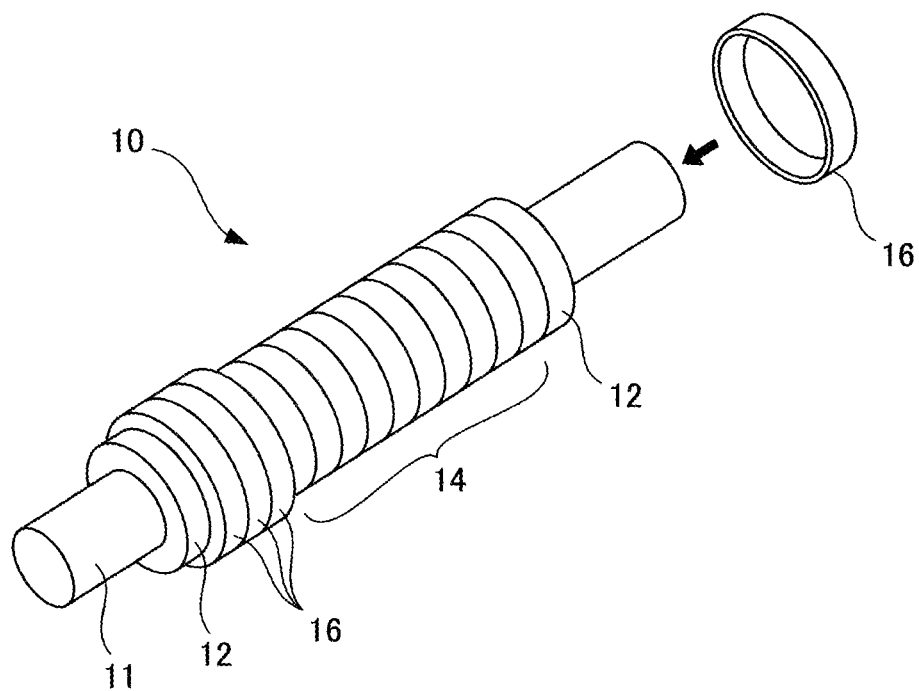
FIG. 1 is a perspective view explaining a rotor in a permanent magnet rotating electric machine according to the present invention.

Embodiments of a permanent magnet rotating electric machine according to the present invention will be described below with reference to FIGS. 1 to 5C. Note that since the present invention relates to the structure of a rotor in a permanent magnet rotating electric machine, FIGS. 1 to 5C mainly illustrate a rotor.

Embodiment 1

A permanent magnet rotating electric machine in this embodiment will be described with reference to FIGS. 1 to 3C. The permanent magnet rotating electric machine in this embodiment has a rotor 10 and a cylindrical stator 20 in the inner peripheral side of which the rotor 10 is inserted, and these are housed in a casing (not illustrated).

The rotor 10 has: a rotating shaft 11 rotatably supported in the casing; an electrical steel sheet 13 laminated and disposed on the outer periphery of the rotating shaft 11; a plurality of magnet parts 14 disposed on the outer periphery of the electrical steel sheet 13 along the axial direction of the rotor 10; and a plurality of anti-scattering rings 16 (annular members) fitted by press fitting on the outer peripheries of the plurality of magnet parts 14 along the axial direction of the rotor 10. Each single magnet part 14 is formed of a plurality of permanent magnets, and these are attached in an annular shape to the outer periphery of the electrical steel sheet 13. In other words, the permanent magnet rotating electric machine in this embodiment is a surface-attached permanent magnet rotating electric machine, or a so-called SPM motor.

Also, at the opposite ends of the rotating shaft 11 are provided fixing rings 12 that fix the plurality of magnet parts 14. Also, a gap 17 is formed between the rotor 10 and the stator 20, and an insulating fluid for cooling (such as air for air cooling or cooling oil for oil cooling) flows therein.

Note that in FIGS. 2A to 2C and FIGS. 3A to 3C, N is an integer of 2 or greater, and the (N−1)-th magnet part 14 is denoted as "14(N−1)", the N-th magnet part 14 is denoted as "14(N)", and the (N+1)-th magnet part 14 is denoted as "14(N+1)". Similarly, the (N−1)-th anti-scattering ring 16 is denoted as "16(N−1)", the N-th anti-scattering ring 16 is denoted as "16(N)", and the (N+1)-th anti-scattering ring 16 is denoted as "16(N+1)".

Moreover, in this embodiment, the configurations of the magnet parts 14 and the anti-scattering rings 16 are devised so as to reduce eddy current loss.

Specifically, a corner or angular portion originally present between the outer peripheral surface (anti-scattering ring 16-side surface) of each magnet part 14 and one or both of its side surfaces is chamfered, so that a flat chamfered surface 14a (second chamfered surface) is provided. Also, an insulating coating 14b (second side surface insulating portion) is provided on one or both of the side surfaces in abutment with the other neighboring magnet parts 14.

Figure 2A:
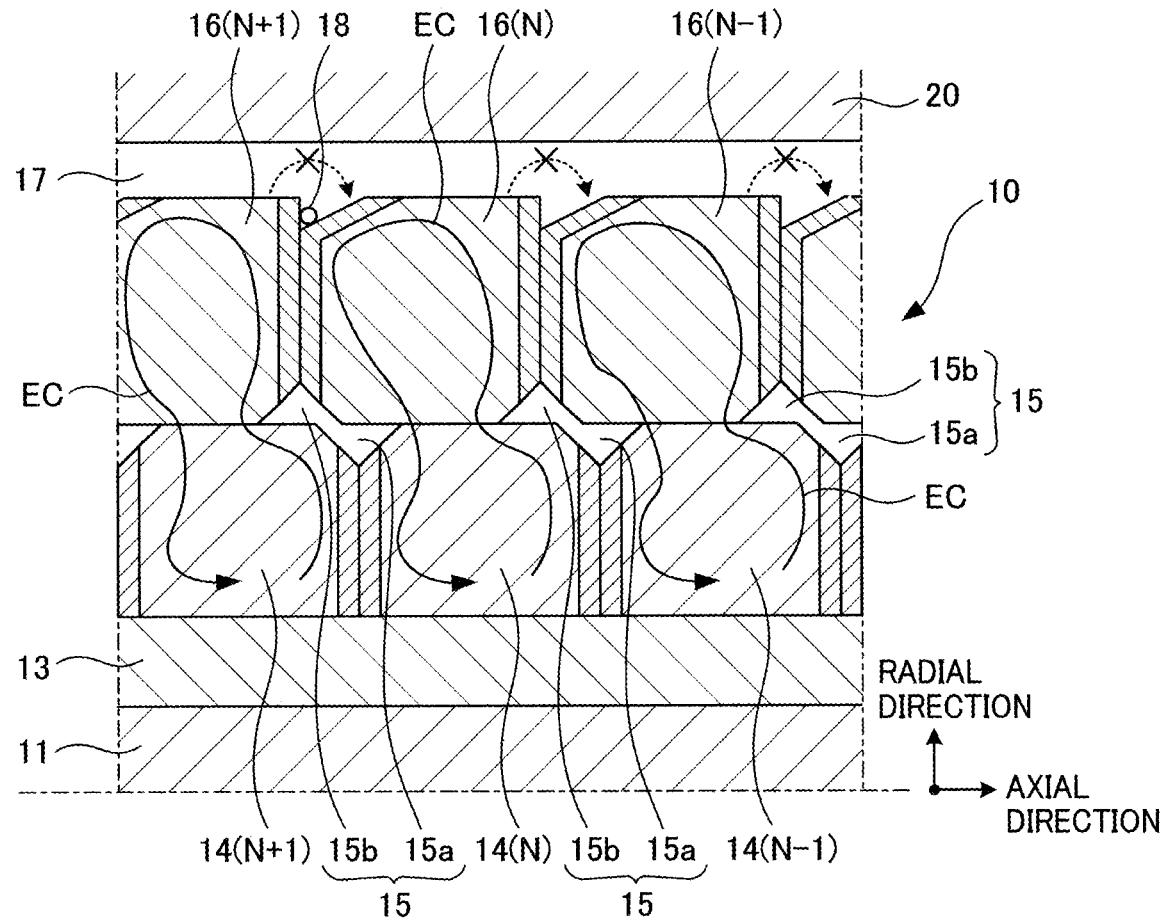
FIG. 2A is a view explaining the structure of a rotor as an exemplary embodiment (embodiment 1) of the permanent magnet rotating electric machine according to the present invention, and is a cross-sectional view of the rotor.
Figure 2B:
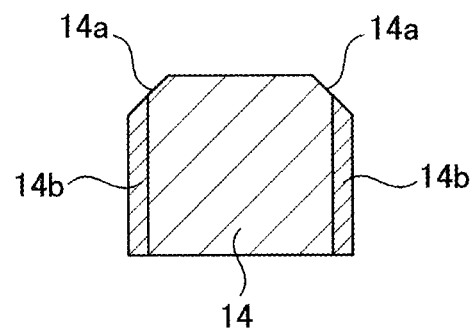
FIG. 2B is a view explaining the structure of the rotor as the exemplary embodiment (embodiment 1) of the permanent magnet rotating electric machine according to the present invention, and is a cross-sectional view of a magnet part of the rotor.
Figure 2C:
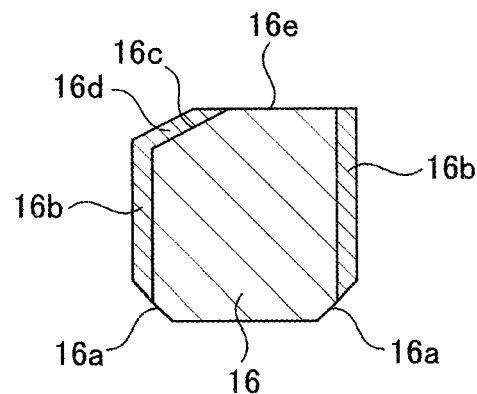
FIG. 2C is a view explaining the structure of the rotor as the exemplary embodiment (embodiment 1) of the permanent magnet rotating electric machine according to the present invention, and is a cross-sectional view of an anti-scattering ring of the rotor.
Figure 3A:
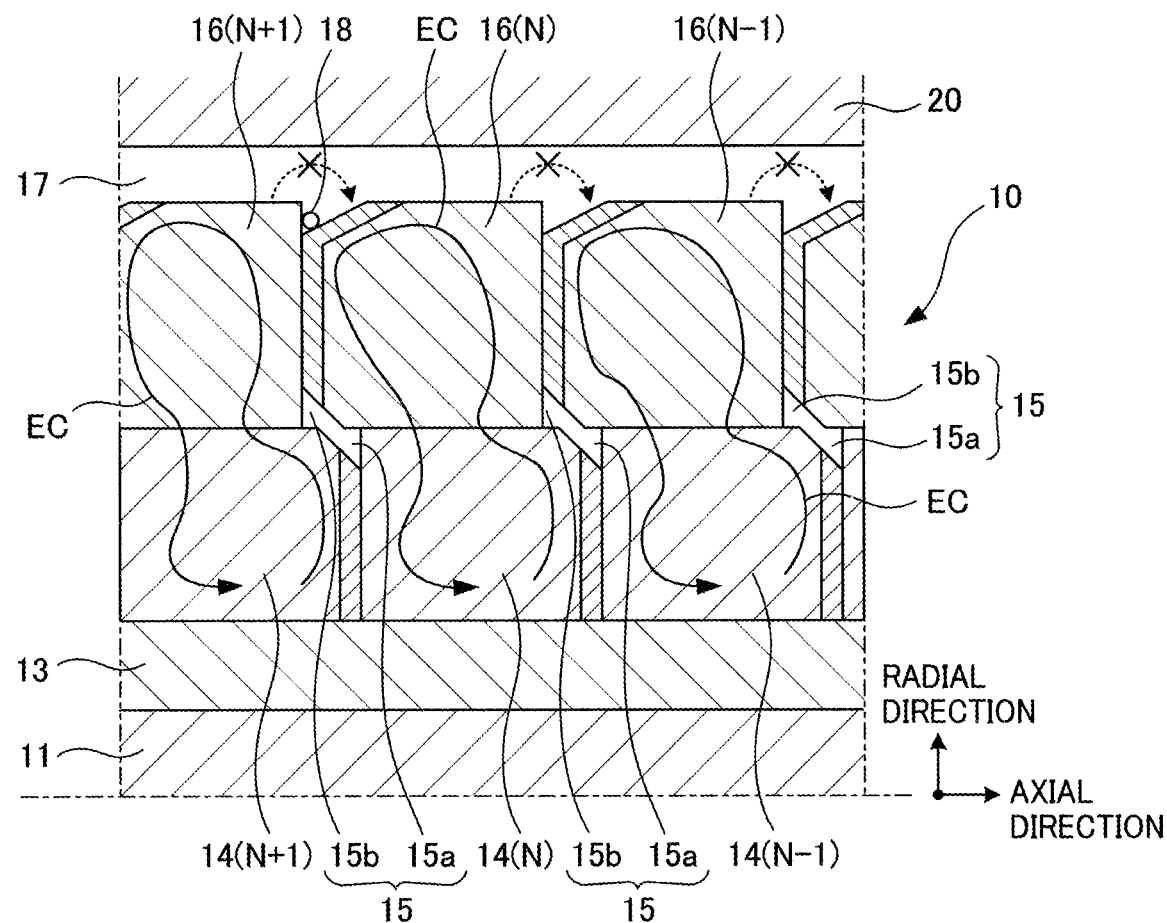
FIG. 3A is a view explaining the structure of a rotor as a modification of the permanent magnet rotating electric machine illustrated in FIGS. 2A to 2C, and is a cross-sectional view of the rotor.
Figure 3B:
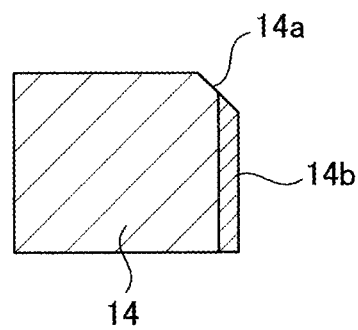
FIG. 3B is a view explaining the structure of the rotor as the modification of the permanent magnet rotating electric machine illustrated in FIGS. 2A to 2C, and is a cross-sectional view of a magnet part of the rotor.
Figure 3C:
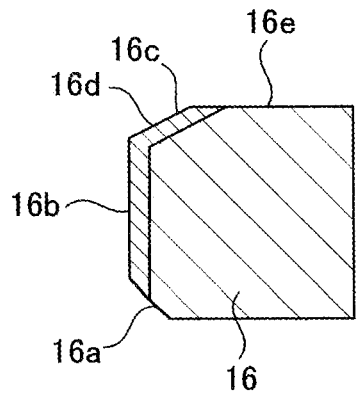
FIG. 3C is a view explaining the structure of the rotor as the modification of the permanent magnet rotating electric machine illustrated in FIGS. 2A to 2C, and is a cross-sectional view of an anti-scattering ring of the rotor.

Note that FIGS. 2A to 2C illustrate a configuration in which each magnet part 14 has the chamfered surface 14a provided between the outer peripheral surface and both side surfaces and the insulating coating 14b provided on both side surfaces in abutment with the other neighboring magnet parts 14. Also, FIGS. 3A to 3C illustrate a configuration in which each magnet part 14 has the chamfered surface 14a provided between the outer peripheral surface and one of the side surfaces and the insulating coating 14b provided on one of the side surfaces in abutment with the other neighboring magnet parts 14.

Moreover, a corner or angular portion originally present between the inner peripheral surface (magnet part 14-side surface) of each anti-scattering ring 16 and one or both of its side surfaces is chamfered, so that a flat chamfered surface 16a (first chamfered surface) is provided. Also, an insulating coating 16b (first side surface insulating portion) is provided on one or both of the side surfaces in abutment with the other neighboring anti-scattering rings 16. Also, a corner or angular portion originally present between the outer peripheral surface (stator 20-side surface) and one of the side surfaces (the left side surface in the figure) is chamfered, so that a flat chamfered surface 16c is provided. An insulating coating 16d (chamfered surface insulating portion) is provided on this chamfered surface 16c as well.

Note that FIGS. 2A to 2C illustrate a configuration in which each anti-scattering ring 16 has the chamfered surface 16a provided between the inner peripheral surface and both side surfaces and the insulating coating 16b provided on both side surfaces in abutment with the other neighboring anti-scattering rings 16. Also, FIGS. 3A to 3C illustrate a configuration in which each anti-scattering ring 16 has the chamfered surface 16a provided between the inner peripheral surface and one of the side surfaces and the insulating coating 16b provided on one of the side surfaces in abutment with the other neighboring anti-scattering rings 16.

As described above, in this embodiment, it suffices that an insulating coating is formed on some of the surfaces of the magnet parts 14 and the anti-scattering rings 16. An insulating coating does not need to be formed on all surfaces. This reduces the film formation cost of the insulating coatings.

Meanwhile, for example, a ceramic-based film, a resin-based film, a DLC (Diamond-Like carbon) film, and so on are usable as the above insulating coatings 14b, 16b, and 16d. For the ceramic-based film, an oxide ceramic such as aluminum oxide (alumina), a nitride ceramic such as titanium nitride (TiN) or chromium nitride (CrN), plasma electrolytic oxidation (PEO), and so on are available. For the resin-based film, a polyimide resin, an epoxy resin, and so on are available. In particular, the DLC film is a preferable material for the insulating coatings 14b, 16b, and 16d for its superior mechanical properties such as low friction properties, low wear properties, and high hardness comparable to that of diamond and anti-corrosion properties as well as its superior electrical insulation properties and sliding properties.

When a rotor 10 is constructed using magnet parts 14 and anti-scattering rings 16 with configurations as described above, the chamfered surface 14a of one or both of the neighboring magnet parts 14 forms a space 15a. This space 15a is disposed on the anti-scattering ring 16 side of the boundary between the neighboring magnet parts 14. Also, the chamfered surface 16a of one or both of the neighboring anti-scattering rings 16 forms a space 15b. This space 15b is disposed on the magnet part 14 side of the boundary between the neighboring anti-scattering rings 16.

Moreover, the magnet parts 14 and the anti-scattering rings 16 are disposed such that the space 15a and the space 15b communicate with each other, thereby forming a space 15. The thus formed space 15 functions as an electrically insulating layer with an insulating fluid (such as air or cooling oil) present in the space.

Here, the spaces 15a and 15b both have triangular cross sections. Note however that the spaces 15a and 15b may have any cross-sectional shapes as long as they can provide a space that functions as an insulating layer. For example, the spaces 15a and 15b may have cross sections of trapezoidal or other polygonal shapes.

Without such spaces 15, eddy current paths may possibly be formed even when the neighboring magnet parts 14 and the neighboring anti-scattering rings 16 are insulated from each other by the insulating coatings or insulating materials.

For example, assume that, as illustrated in FIG. 6, in a rotor 40, neighboring magnet parts 43 are insulated from each other by insulating materials 44 (or insulating coatings) and neighboring anti-scattering rings 45 are insulated from each other by insulating materials 46 (or insulating coatings). In such a structure, eddy current paths may be formed between the neighboring magnet parts 43 and anti-scattering rings 45 if the magnet parts 43 or the anti-scattering rings 45 have dimensional errors, or the magnet parts 43 or the anti-scattering rings 45 have positional errors in their assembly. Note that in FIG. 6, reference numeral 41 denotes a rotating shaft, reference numeral 42 denotes an electrical steel sheet, and reference numeral 50 denotes a stator.

In such a case, an eddy current EC1 generated in the (N−1)-th magnet part 43 is conducted into the N-th magnet part 43 through the (N−1)-th anti-scattering ring 45 and further conducted into the (N+1)-th magnet part 43 through the N-th anti-scattering ring 45. Similarly, an eddy current EC2 generated in the (N−1)-th anti-scattering ring 45 is conducted into the N-th anti-scattering ring 45 through the N-th magnet part 43 and further conducted into the (N+1)-th anti-scattering ring 45 through the (N+1)-th magnet part 43.

Note that in FIG. 6 too, N is an integer of 2 or greater, and the (N−1)-th magnet part 43 is denoted as "43(N−1)", the N-th magnet part 43 is denoted as "43(N)", and the (N+1)-th magnet part 43 is denoted as "43 (N+1)". Similarly, the (N−1)-th anti-scattering ring 45 is denoted as "45(N−1)", the N-th anti-scattering ring 45 is denoted as "45(N)", and the (N+1)-th anti-scattering ring 45 is denoted as "45 (N+1)".

In contrast, in this embodiment, an eddy current EC generated in the (N−1)-th magnet part 14 is conducted into the (N−1)-th anti-scattering ring 16, but is not conducted into either the N-th magnet part 14 or the N-th anti-scattering ring 16 since the insulating coatings 14b and 16b and the space 15 are present. Similarly, an eddy current EC generated in the (N)-th magnet part 14 is conducted into the (N)-th anti-scattering ring 16, but is not conducted into either the (N+1)-th magnet part 14 or the (N+1)-th anti-scattering ring 16 since the insulating coatings 14b and 16b and the space 15 are present.

This also applies to eddy currents generated in the anti-scattering rings 16. For example, an eddy current generated in the (N−1)-th anti-scattering ring 16 is conducted into the (N−1)-th magnet part 14, but is not conducted into either the N-th magnet part 14 or the N-th anti-scattering ring 16 since the insulating coatings 14b and 16b and the space 15 are present. Similarly, an eddy current generated in the N-th anti-scattering ring 16 is conducted into the N-th magnet part 14, but is not conducted into either the (N+1)-th magnet part 14 or the (N+1)-th anti-scattering ring 16 since the insulating coatings 14b and 16b and the space 15 are present.

Thus, since the space 15 is formed in addition to the insulating coatings 14b and 16b, the presence of the space 15 blocks eddy currents EC1 and EC2 as illustrated in FIG. 6 even if the magnet parts 14 or the anti-scattering rings 16 have dimensional errors or positional errors. Hence, conduction of the eddy currents EC is suppressed and accordingly eddy current loss is reduced.

Also, when a rotor 10 is constructed using anti-scattering rings 16 with a configuration as described above, the chamfered surface 16c with the insulating coating 16d thereon is disposed at the boundary between the neighboring anti-scattering rings 16 on the outer peripheral surface side of the rotor 10.

Since the insulating coating 16d is disposed at the boundary between the neighboring anti-scattering rings 16 as described above, even if an electrically conductive material 18, such as iron powder, is present at the boundary between the neighboring anti-scattering rings 16 in a configuration in which no insulating coating is on an outer peripheral surface 16e (or an insulating coating formed on the outer peripheral surface 16e has been detached), eddy current will not be conducted between the outer peripheral surfaces of the anti-scattering rings 16. Accordingly, eddy current loss is reduced. For example, as illustrated in FIGS. 2A to 2C, eddy current will not be conducted from the (N+1)-th anti-scattering ring 16 to the N-th anti-scattering ring 16 even if an electrically conductive material 18 is present at the boundary between the neighboring anti-scattering rings 16.

The eddy current loss is reduced in the above-described manner.

Meanwhile, the anti-scattering rings 16 are fitted on the outer peripheries of the magnet parts 14 by press fitting, without using adhesive or shrink fitting. Note that FIG. 1 illustrates a state in the middle of fitting the anti-scattering rings 16 onto the outer peripheries of the magnet parts 14.

Since the magnet parts 14 have the chamfered surfaces 14a and the anti-scattering rings 16 have the chamfered surfaces 16a, their corner portions do not get caught on each other and the magnet parts 14 are less likely to be scratched when the anti-scattering rings 16 are fitted onto the outer peripheries of the magnet parts 14. The magnet parts 14 can thus be fitted by press fitting instead of shrink fitting. Accordingly, the operation time can be shortened. Note that, in view of the press fitting operation, as illustrated in FIGS. 3A to 3C, it is desirable to provide each magnet part 14 with the chamfered surface 14a at least on its side-surface side opposite to the side toward which the press fitting is performed (the right side in the figure), and to provide each anti-scattering ring 16 with the chamfered surface 16a at least on its side-surface side toward which the press fitting is performed (the left side in the figure).

Meanwhile, the chamfered surface 16c and the insulating coating 16d are provided only on one side-surface side of each anti-scattering ring 16, that is, only on the side-surface side toward which the press fitting is performed (left side in the figure), and not provided on the other side-surface side. Accordingly, when a press fitting jig for press-fitting the anti-scattering ring 16 is used, the area of contact between the other side surface and the press fitting jig is larger and thus the surface pressure exerted on the other side surface is lower. In the case where the insulating coating 16b is present on this other side surface, it is possible to prevent its detachment.

With the anti-scattering rings 16 fitted onto the outer peripheries of the magnet parts 14 as described above, the magnet parts 14 are prevented from scattering. Thus, the centrifugal endurance of the rotor 10 is improved. This enables the permanent magnet rotating electric machine in this embodiment to handle high-speed rotation and highly fluctuating torque.

For the anti-scattering rings 16 as above, a titanium-based material (e.g., titanium alloy) is desirable. Titanium is light and strong and has a coefficient of thermal expansion comparable to that of permanent magnets, and thus is not cracked by stress or displaced by expansion even under a high-temperature condition. The titanium-based material therefore provides sufficient strength for the rings to prevent scattering of the magnet parts 14 and fix their positions.

Thus, in this embodiment, eddy current loss in the magnet parts 14 and the anti-scattering rings 16 is reduced even during high-speed rotation or when highly fluctuating torque is generated. Hence, it is possible to prevent the thermal demagnetization of the magnet parts 14 and the deterioration of the motor performance due eddy current loss. It is also possible to increase the speed since the centrifugal endurance is improved by the anti-scattering rings 16.

Also, since a jig such as a spacer for forming a clearance is not needed in the manufacturing process, the jig cost is lower. Also, since the anti-scattering rings 16 are fitted by using press fitting instead of shrink fitting in the manufacturing process, the manufacturing process is simpler. Also, since no insulating coating is needed on the outer peripheral surface 16e of each anti-scattering ring 16, the film formation cost of the insulating coatings is lower, so that the manufacturing cost for protecting the outer peripheral surface of the rotor 10 is lower.

Note that the above chamfered surfaces 14a, 16a, and 16c may be curved surfaces instead of flat surfaces. For example, the chamfered surfaces 14a, 16a, and 16c may be curved surfaces that allow the neighboring surfaces join smoothly. Also, instead of the insulating coatings 14b and 16b, insulating materials may be interposed between the magnet parts 14 and between the anti-scattering rings 16.

Also, in the above, a configuration has been presented which has both the joined space 15 (spaces 15a and 15b) and the insulating coating 16d, formed on the chamfered surface 16c. However, it is possible to reduce eddy current loss with a configuration having one of them.

Embodiment 2

A permanent magnet rotating electric machine in this embodiment will be described with reference to FIGS. 4A to 4C and FIGS. 5A to 5C. Note that the permanent magnet rotating electric machine in this embodiment differs from the permanent magnet rotating electric machine presented in embodiment 1 in the configuration of part of each magnet part 14 and/or part of each anti-scattering ring 16, and the other features of the configuration are the same. Thus, equivalent features of the configuration to those of the permanent magnet rotating electric machine presented in embodiment 1 are designated by same reference numerals, and overlapping description is omitted.

In this embodiment too, the configurations of the magnet parts 14 and the anti-scattering rings 16 are devised so as to reduce eddy current loss.

Figure 4A:
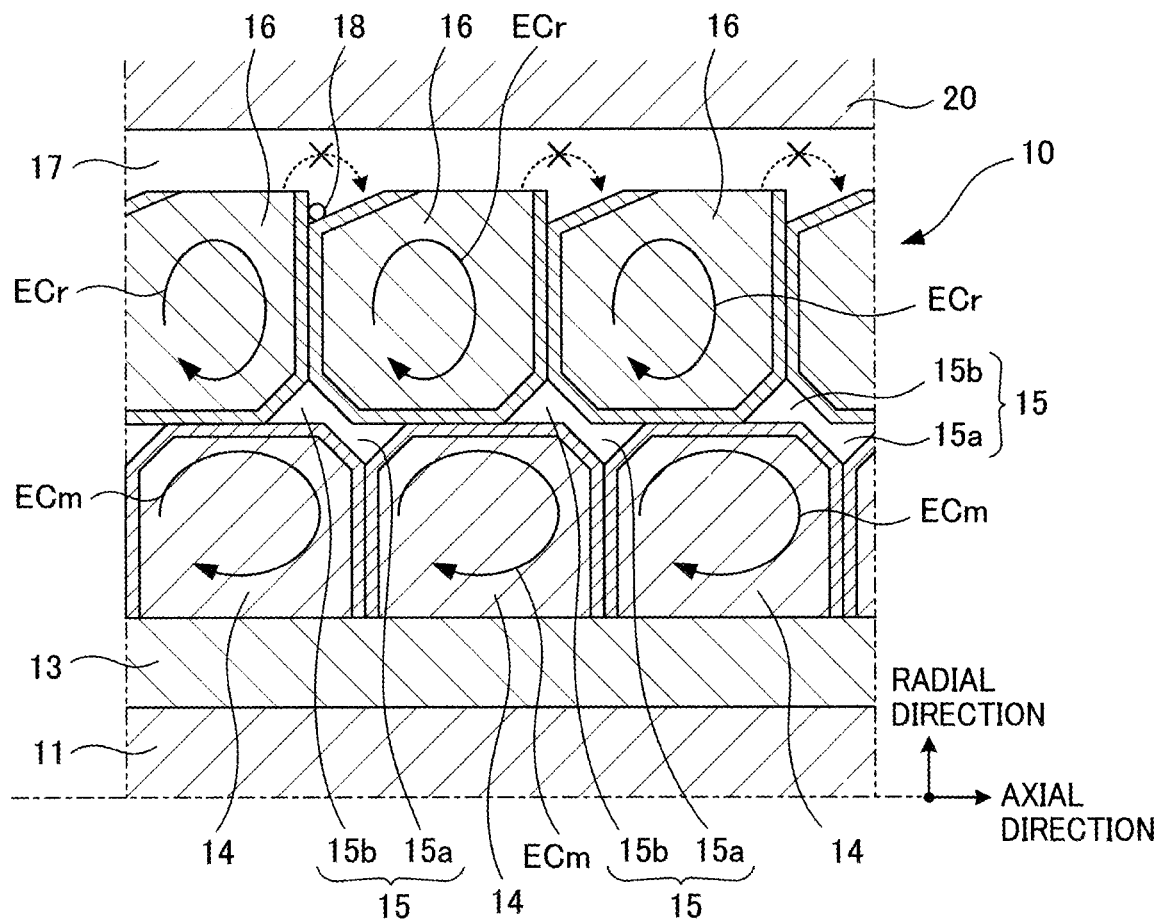
FIG. 4A is a view explaining the structure of a rotor as another exemplary embodiment (embodiment 2) of the permanent magnet rotating electric machine according to the present invention, and is a cross-sectional view of the rotor.
Figure 4B:
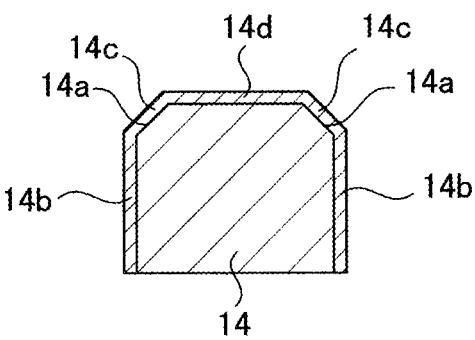
FIG. 4B is a view explaining the structure of the rotor as the other exemplary embodiment (embodiment 2) of the permanent magnet rotating electric machine according to the present invention, and is a cross-sectional view of a magnet part of the rotor.
Figure 4C:
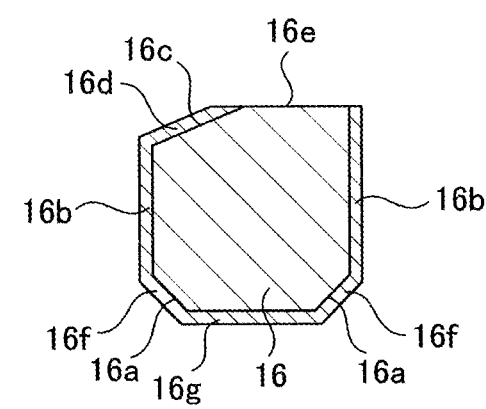
FIG. 4C is a view explaining the structure of the rotor as the other exemplary embodiment (embodiment 2) of the permanent magnet rotating electric machine according to the present invention, and is a cross-sectional view of an anti-scattering ring of the rotor.
Figure 5A:
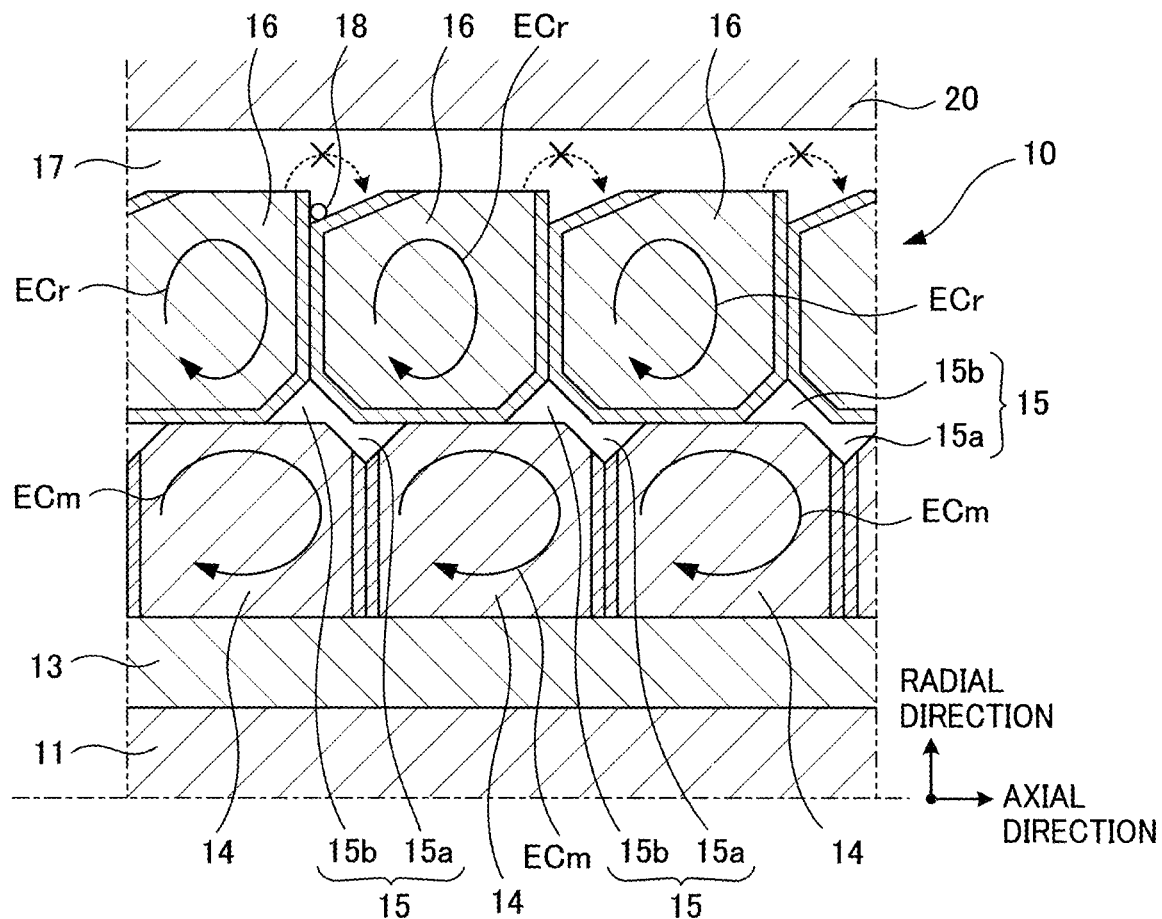
FIG. 5A is a view explaining the structure of a rotor as a modification of the permanent magnet rotating electric machine illustrated in FIGS. 4A to 4C, and is a cross-sectional view of the rotor.
Figure 5B:
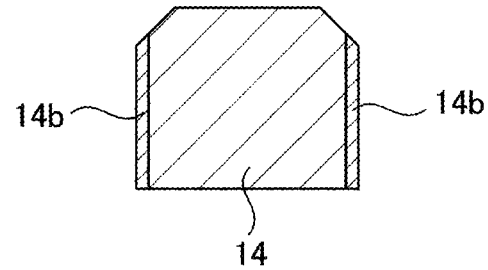
FIG. 5B is a view explaining the structure of the rotor as the modification of the permanent magnet rotating electric machine illustrated in FIGS. 4A to 4C, and is a cross-sectional view of a magnet part of the rotor.
Figure 5C:
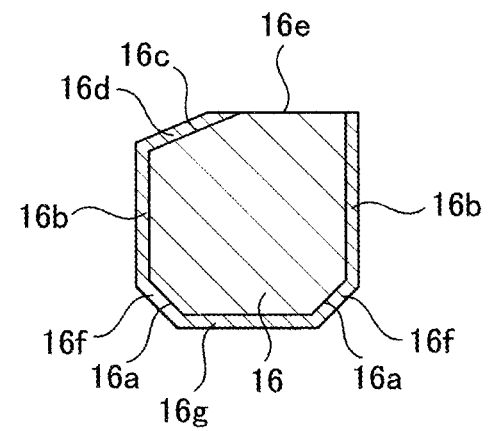
FIG. 5C is a view explaining the structure of the rotor as the modification of the permanent magnet rotating electric machine illustrated in FIGS. 4A to 4C, and is a cross-sectional view of an anti-scattering ring of the rotor.

Specifically, as illustrated in FIGS. 4A to 4C, each magnet part 14 is further provided with an insulating coating 14c (second chamfered surface insulating portion) on the chamfered surfaces 14a, and an insulating coating 14d (outer peripheral surface insulating portion) on the outer peripheral surface (anti-scattering ring 16-side surface). In short, the insulating coating 14c and the insulating coating 14d are further added to each magnet part 14 in embodiment 1.

Also, as illustrated in FIGS. 4A to 4C, each anti-scattering ring 16 is further provided with an insulating coating 16f (first chamfered surface insulating portion) on the chamfered surfaces 16a, and an insulating coating 16g (inner peripheral surface insulating portion) on the inner peripheral surface (magnet part 14-side surface). In short, the insulating coating 16f and the insulating coating 16g are further added to each anti-scattering ring 16 in embodiment 1.

Note that in this embodiment, as long as either the magnet part 14 or the anti-scattering ring 16 has the configuration illustrated in FIG. 4B or 4C, the other may have the configuration illustrated in FIG. 2B or 2C or the configuration illustrated in FIG. 3B or 3C.

In short, it suffices that at least either the insulating coating 14d of the magnet part 14 or the insulating coating 16g of the anti-scattering ring 16 is present. Also, it is preferable that the insulating coating 14c of the magnet part 14 and the insulating coating 16f of the anti-scattering ring 16 be present in view of press fitting to be described later. In view of eddy current, however, they are not necessarily essential as long as the joined space 15 (spaces 15a and 15b) can be formed. Note that FIGS. 5A to 5C exemplarily illustrate a configuration combined with the magnet parts 14 discussed in embodiment 1 (see FIG. 2B) as an example of the combination mentioned above.

Thus, in this embodiment too, it suffices that an insulating coating is formed on some of the surfaces of the magnet parts 14 and the anti-scattering rings 16. An insulating coating does not need to be formed on all surfaces. This reduces the film formation cost of the insulating coatings. Also, as in embodiment 1, a ceramic-based film, a resin-based film, a DLC film, and so on are usable as the above insulating coatings 14c, 14d, 16f, and 16g, and in particular the DLC film is preferable.

Moreover, in this embodiment, in the case where the insulating coating 14c is on the chamfered surface 14a, the chamfered surface 14a of one or both of the neighboring magnet parts 14 and the insulating coating 14c thereon form a space 15a. Similarly, in the case where the insulating coating 16f is on the chamfered surface 16a, the chamfered surface 16a of one or both of the neighboring anti-scattering rings 16 and the insulating coating 16f thereon form a space 15b.

Thus, in this embodiment, an eddy current ECm generated in each magnet part 14 is not conducted into the other neighboring magnet parts 14 since there are the insulating coating 14b, or into the neighboring anti-scattering rings 16 since the insulating coating 14d and/or the insulating coating 16g and the space 15 are present. Similarly, an eddy current ECr generated in each anti-scattering ring 16 is not conducted into the other neighboring anti-scattering rings 16 since there are the insulating coating 16b, or into the neighboring magnet parts 14 since the insulating coating 14d and/or the insulating coating 16g and the space 15 are present.

Thus, since the insulating coating 14d and/or 16g is formed in addition to the insulating coatings 14b and 16b and the space 15, the presence of the insulating coating 14d and/or 16g and the space 15 prevents the eddy currents ECm and ECr from being conducted into the other neighboring magnet parts 14 and anti-scattering rings 16 even if the magnet parts 14 or the anti-scattering rings 16 have dimensional errors or positional errors. This reduces eddy current loss.

As described above, this embodiment has advantageous effects equivalent to those of embodiment 1 and, as for the reduction of eddy current loss mentioned in embodiment 1, achieves a further reduction. Hence, it is possible to further prevent the thermal demagnetization of the magnet parts 14 and the deterioration of the motor performance due eddy current loss.

Also, in this embodiment, the insulating coating 14c is formed on the chamfered surface 14a of each magnet part 14 and the insulating coating 14d is formed on its outer peripheral surface, and/or the insulating coating 16f is formed on the chamfered surface 16a of each anti-scattering ring 16 and the insulating coating 16g is formed on its inner peripheral surface. In the case where these insulating coating 14c, 14d, 16f, and 16g are DLC films, it is easier to fit the anti-scattering ring 16 by press fitting since the DLC films have superior sliding properties and low-friction properties as well as superior electrical insulation properties. Accordingly, the operation time can be further shortened.

In this embodiment too, a configuration has been presented which has both the joined space 15 (spaces 15a and 15b) and the insulating coating 16d, formed on the chamfered surface 16c. Note, however, that eddy current loss can be reduced with a configuration having one of them.

INDUSTRIAL APPLICABILITY

The present invention is advantageous for a surface-attached permanent magnet rotating electric machine, or a so-called SPM motor, and is usable as a motor for a dynamometer for testing performance and endurance of a drive-system component such as a transmission, for example.

EXPLANATION OF REFERENCE NUMERALS 10 rotor
11 rotating shaft
14 magnet part
14a chamfered surface
14b, 14c, 14d insulating coating
15 (15a, 15b) space
16 anti-scattering ring
16a chamfered surface
16b insulating coating
16c chamfered surface
16d insulating coating
16e outer peripheral surface
16f, 16g insulating coating
20 stator

The invention claimed is:

1. A permanent magnet rotating electric machine comprising:
   a plurality of magnet parts each including a plurality of permanent magnets attached to each other in an annular shape, the plurality of magnet parts being disposed along an axial direction of a rotor; and
   a plurality of annular members press-fitted on outer peripheries of the plurality of magnet parts along the axial direction,
   wherein each of the annular members has a first side surface insulating portion provided on one or both of side surfaces in abutment with other neighboring ones of the annular members, a chamfered surface provided between an outer peripheral surface and one of the side surfaces, and a chamfered surface insulating portion provided on the chamfered surface.

2. The permanent magnet rotating electric machine according to claim 1, wherein
   the chamfered surface is a flat surface or a curved surface.

3. The permanent magnet rotating electric machine according to claim 2, wherein
   the chamfered surface is provided on a side toward which the press fitting is performed.

4. The permanent magnet rotating electric machine according to claim 1, wherein
   the chamfered surface is provided on a side toward which the press fitting is performed.

5. A permanent magnet rotating electric machine comprising:
   a plurality of magnet parts each including a plurality of permanent magnets attached to each other in an annular shape, the plurality of magnet parts being disposed along an axial direction of a rotor; and
   a plurality of annular members press-fitted on outer peripheries of the plurality of magnet parts along the axial direction,
   wherein each of the annular members has a first side surface insulating portion provided on one or both of side surfaces in abutment with other neighboring ones of the annular members, and a first chamfered surface provided between an inner peripheral surface and one or both of the side surfaces,
   each of the magnet parts has a second side surface insulating portion provided on one or both of side surfaces in abutment with other neighboring ones of the magnet parts, and a second chamfered surface provided between an outer peripheral surface and one or both of the side surfaces, and
   the magnet parts and the annular members are disposed such that a space formed by the first chamfered surface of one or both of the neighboring annular members and a space formed by the second chamfered surface of one or both of the neighboring magnet parts communicate with each other.

6. The permanent magnet rotating electric machine according to claim 5, wherein
   each of the first chamfered surface and the second chamfered surface is a flat surface or a curved surface.

7. The permanent magnet rotating electric machine according to claim 6, wherein
   each of the annular members has an inner peripheral surface insulating portion provided on an inner peripheral surface.

8. The permanent magnet rotating electric machine according to claim 7, wherein each of the magnet parts has an outer peripheral surface insulating portion provided on an outer peripheral surface.

9. The permanent magnet rotating electric machine according to claim 8, further comprising at least one of:
a first chamfered surface insulating portion provided on the first chamfered surface; and
a second chamfered surface insulating portion provided on the second chamfered surface.

10. The permanent magnet rotating electric machine according to claim 7, further comprising at least one of:
a first chamfered surface insulating portion provided on the first chamfered surface; and
a second chamfered surface insulating portion provided on the second chamfered surface.

11. The permanent magnet rotating electric machine according to claim 6, wherein
each of the magnet parts has an outer peripheral surface insulating portion provided on an outer peripheral surface.

12. The permanent magnet rotating electric machine according to claim 11, further comprising at least one of:
a first chamfered surface insulating portion provided on the first chamfered surface; and
a second chamfered surface insulating portion provided on the second chamfered surface.

13. The permanent magnet rotating electric machine according to claim 6, further comprising at least one of:
a first chamfered surface insulating portion provided on the first chamfered surface; and
a second chamfered surface insulating portion provided on the second chamfered surface.

14. The permanent magnet rotating electric machine according to claim 5, wherein
each of the annular members has an inner peripheral surface insulating portion provided on an inner peripheral surface.

15. The permanent magnet rotating electric machine according to claim 14, wherein
each of the magnet parts has an outer peripheral surface insulating portion provided on an outer peripheral surface.

16. The permanent magnet rotating electric machine according to claim 15, further comprising at least one of:
a first chamfered surface insulating portion provided on the first chamfered surface; and
a second chamfered surface insulating portion provided on the second chamfered surface.

17. The permanent magnet rotating electric machine according to claim 14, further comprising at least one of:
a first chamfered surface insulating portion provided on the first chamfered surface; and
a second chamfered surface insulating portion provided on the second chamfered surface.

18. The permanent magnet rotating electric machine according to claim 5, wherein
each of the magnet parts has an outer peripheral surface insulating portion provided on an outer peripheral surface.

19. The permanent magnet rotating electric machine according to claim 18, further comprising at least one of:
a first chamfered surface insulating portion provided on the first chamfered surface; and
a second chamfered surface insulating portion provided on the second chamfered surface.

20. The permanent magnet rotating electric machine according to claim 5, further comprising at least one of:
a first chamfered surface insulating portion provided on the first chamfered surface; and
a second chamfered surface insulating portion provided on the second chamfered surface.

* * * * *